United States Patent [19]
Bright et al.

[11] Patent Number: 6,141,756
[45] Date of Patent: Oct. 31, 2000

[54] APPARATUS AND METHOD OF READING A PROGRAM INTO A PROCESSOR

[75] Inventors: Michael W. Bright, Arlington Heights; Kenneth Carl Fuchs, Winfield; Kelly Jo Marquardt, Algonquin, all of Ill.

[73] Assignee: Motorola, Inc., Schaumburg, Ill.

[21] Appl. No.: 09/067,110

[22] Filed: Apr. 27, 1998

[51] Int. Cl.[7] .................................................. G06F 11/30
[52] U.S. Cl. .............................. 713/200; 713/2; 713/189; 713/190; 713/191; 380/287; 705/57; 395/186
[58] Field of Search .................................. 380/4, 25, 287; 395/186; 713/200, 2, 189, 190, 191, 193; 705/57

[56] References Cited

U.S. PATENT DOCUMENTS

| | | |
|---|---|---|
| 5,748,940 | 5/1998 | Angelo et al. ........................ 395/490 |
| 5,844,986 | 12/1998 | Davis ........................................ 380/4 |
| 5,901,225 | 5/1999 | Ireton et al. ............................. 380/4 |
| 5,937,063 | 8/1999 | Davis ........................................ 380/4 |

*Primary Examiner*—Tod R. Swann
*Assistant Examiner*—Paul E. Callahan
*Attorney, Agent, or Firm*—Susan L. Lukasik

[57] ABSTRACT

The following describes an apparatus for and method of providing a secure method of downloading a program into a processor (101) from a device (103) external to the processor (101). The program may be encrypted (207) prior to its entry into the external device (103). The program may also have authentication information added (203 and 207) to it. Authentication information may be provided on an unencrypted and/or an encrypted program. The processor (101) decrypts (307) and/or successfully authenticates (311) the program before allowing the program to be executed by the processor (101).

26 Claims, 2 Drawing Sheets

APPARATUS AND METHOD OF READING A PROGRAM INTO A PROCESSOR

FIELD OF THE INVENTION

This invention relates to processors, including but not limited to adding security to the bootstrap mode of processors.

BACKGROUND OF THE INVENTION

Processors, such as microprocessors, digital signal processors, programmable logic arrays (PLAs), field programmable gate arrays (FPGAs) micro controllers, and microcomputers, are well known. Such devices may include on-board RAM (Random Access Memory), ROM (Read Only Memory), EPROM, timers, I/O ports, and serial ports.

Processors often have a bootstrap mode, also known programming, emulation (debug), or test mode, which entails downloading a bootstrap program (or other data) from an external source, which program is executed by the processor to provide a desired function, which functions are numerous. Devices such as PLAs and other reconfigurable hardware devices also have a bootstrap mode that serves to provide internal hardware configurations from an external device that contains instructions or blueprints for configuration of the device.

Because the program being downloaded in bootstrap mode comes from a source external to the processor, there are potential security risks associated with downloading an external program. Today, security for microprocessors is designed to prevent further reading in and reading out of data using fuses or fusible links that are severed once the program is entered into the microprocessor. Such technology may be found in the PIC™ chip available from Microchip, Inc. Such a solution, however, does not prevent tampering with the external source of information nor does it prevent undesirable programs from entering the processor, and further prevents the device from being programmed at a later time by an authorized programmer, thereby limiting the flexibility of the device.

Accordingly, there is a need for a processor that has a more secure method of downloading a bootstrap program that allows for multiple bootstrap programming of a single device.

DESCRIPTION OF A PREFERRED EMBODIMENT

Figure 1:
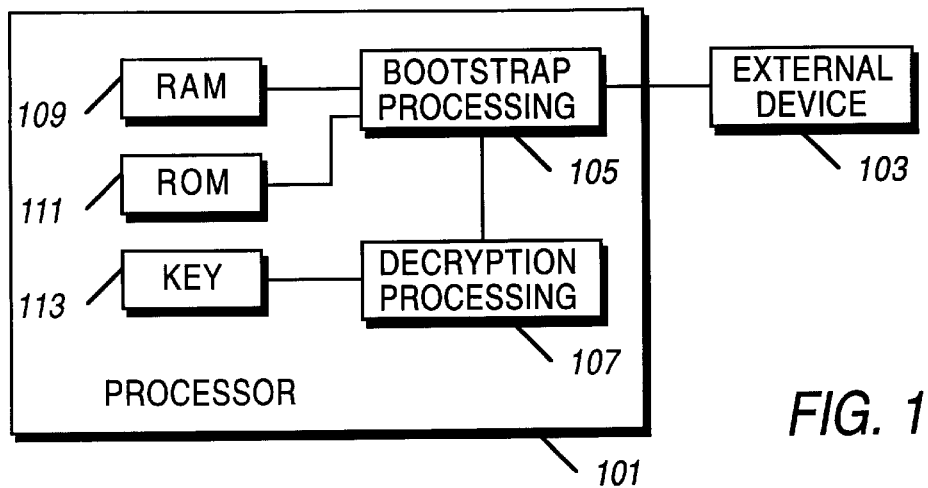
FIG. 1 is a block diagram of a processor in accordance with the invention.

The following describes an apparatus for and method of providing a secure method of downloading a program into a processor from a memory device external to the processor, particularly useful in bootstrap mode. The program may be encrypted prior to its entry into the external device. The program may also have authentication information added to it. Authentication information may be provided on an unencrypted and/or an encrypted program. The processor decrypts and/or authenticates the program before allowing the program to be executed by the processor.

A method of the present invention comprises the steps of entering a bootstrap mode of a processor; reading, into a memory within the processor, a program from an external device; decrypting the program using a key embedded inside the processor, yielding a decrypted program; and executing the decrypted program. The method may further comprise the steps of determining if the program was properly encrypted and when the program was not properly encrypted, inhibiting execution of the program by the processor. The method may further comprise the steps of performing authentication verification on the decrypted program; when the decrypted program is authenticated, executing the decrypted program; and when the decrypted program fails to be authenticated, inhibiting execution of the program by the processor.

A method of the present invention comprises the steps of entering a bootstrap mode of a processor; reading, by a first memory within the processor, a program from an external device; performing authentication verification on the program; when the program is authenticated, executing the decrypted program; and when the decrypted program fails to be authenticated, inhibiting execution of the program by the processor.

The step of inhibiting execution of the program by the processor may comprise the step of stopping the processor from executing any code until a restart of the processor, the step of entering the processor into an infinite loop, or the step of starting the process again, beginning with the entering step. The failure to authenticate may be indicated with an error message. In addition, the method may comprise the step of preventing the executing step from occurring without successfully completing the authenticating step. The step of performing authentication verification may comprise the step of performing a checksum on the decrypted program, the step of performing a hash on the decrypted program, the step of performing an encrypted checksum on the decrypted program, or the step of checking a digital signature of the decrypted program. The key embedded inside the processor may be a public decryption key, a private decryption key, or a symmetric decryption key. The key embedded inside the processor may be processed into another key that is used to decrypt the program.

A process in accord with the present invention comprises a first memory device (ROM), arranged and constructed to obtain a program from a device external to the processor during a bootstrap mode; a decryption processor, operably coupled to the first memory device, arranged and constructed to decrypt the program utilizing a key stored within the processor; and a second memory device (RAM) arranged and constructed to store the decrypted program. The processor may also be arranged and constructed to execute the decrypted program only after successful authentication of the decrypted program.

A block diagram of a processor coupled to an external programming device is shown in FIG. 1. A processor 101, such as a custom integrated circuit based on an ARM processor architecture that is available from ARM, LTD., is connected to an external device 103, such as a ROM, EPROM, EEPROM, RAM, or another processor, such as a personal computer or test fixture. The processor 101 contains a bootstrap processing section 105 that performs bootstrap processing when the processor 101 is entered into bootstrap mode. The bootstrap processing section 105 accesses the external device 103 and downloads its program into RAM 109. The information downloaded from the external device may be decrypted, in which case the decryption processing 107 accesses a key 113 in order to decrypt the information. The bootstrap processing section 105 may also authenticate the program downloaded from the external device 103, as shown and described for FIG. 3 below. In the preferred embodiment, the bootstrap processing section 105 is part of the internal ROM of the processor 101 and is separate from the ROM 111 that provides other functions for the processor 101.

The present invention provides three different levels of security. In one level, the program stored in the external device 103 is encrypted, preferably in such a way that only the processor 101 can decrypt the program before the program may be executed. In a second level, the program stored in the external device 103 has added authenticity information, such as a checksum, hash, and so forth, which authenticity information must be authenticated by the processor 101 before the program may be executed. In a third level, the program stored in the external device is both encrypted and has added authenticity information, and the program must be both decrypted and successfully authenticated before the program may be executed. Each of the three different levels of security may be made further secure by using two or more encryption processes and/or two or more authentication procedures, or using a more secure encryption method and/or a more demanding authentication process.

Figure 2:
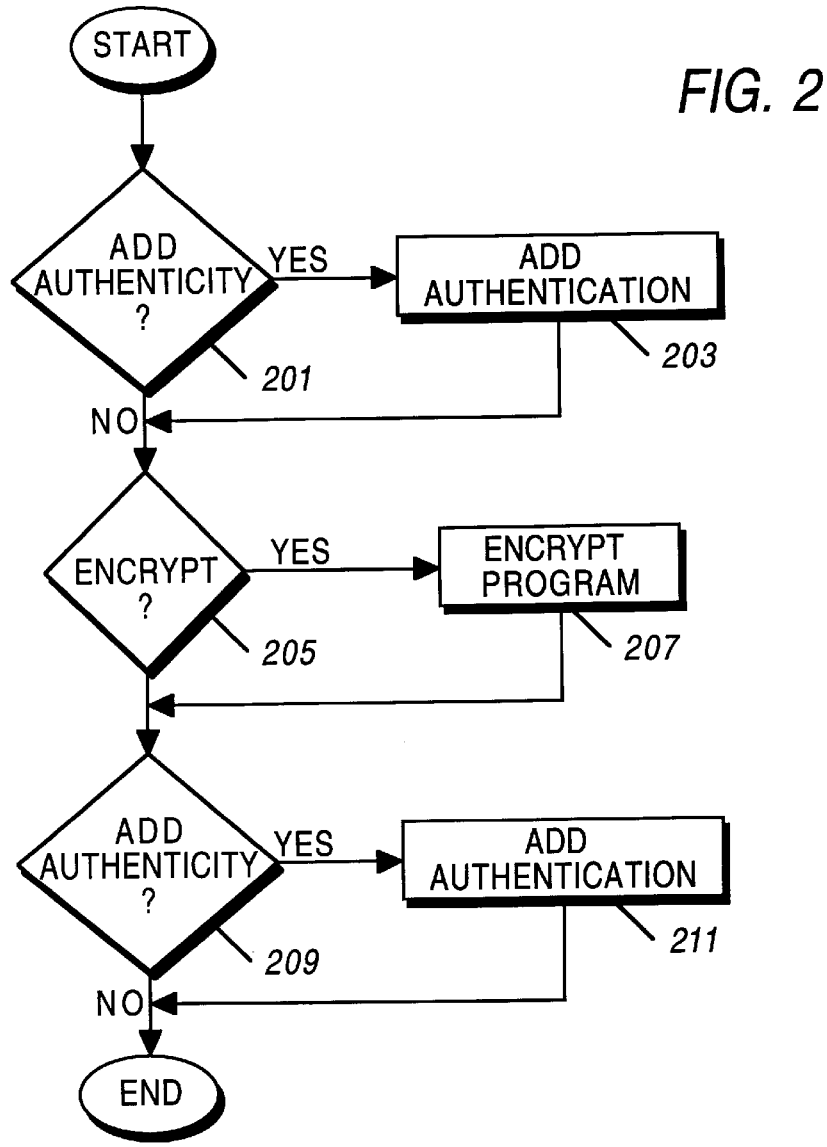
FIG. 2 is a flowchart showing a method of adding authenticity to and/or encrypting a bootstrap program in accordance with the invention.

A flowchart of a method of processing a program for storage in an external device 103 for later entry to a processor 101 is shown in FIG. 2. At step 201, if it is desired to add authenticity to the program to be downloaded, the process continues with step 203, where authentication information is added to the program as necessary. The addition of authentication information may include performing a checksum or an encrypted checksum, also known as a message authentication code, on the unencrypted program. A digital signature of the unencrypted program may also be used to provide authentication.

The process continues with step 205, where it is determined if the processor 101 requires an encrypted program from the external device 103. If encryption is to take place, the program is encrypted at step 205. Encryption methods include digital scrambling of data, public key encryption, private key encryption, symmetric key encryption, and so forth. After step 207, the process continues with step 209, where it is determined if authenticity should be added at this point in the process. If it is, the process continues to step 211, where such authenticity is added, otherwise the process ends. Authentication information added after encryption at step 211 may include a hash, which is a one way checksum performed on an encrypted program, and/or an encrypted checksum (message authentication code) performed on the encrypted program. A digital signature of the encrypted program may also be used to provide authentication. Adding authentication may take place before (step 203) and after encryption (step 209), when the program is to be encrypted.

Figure 3:
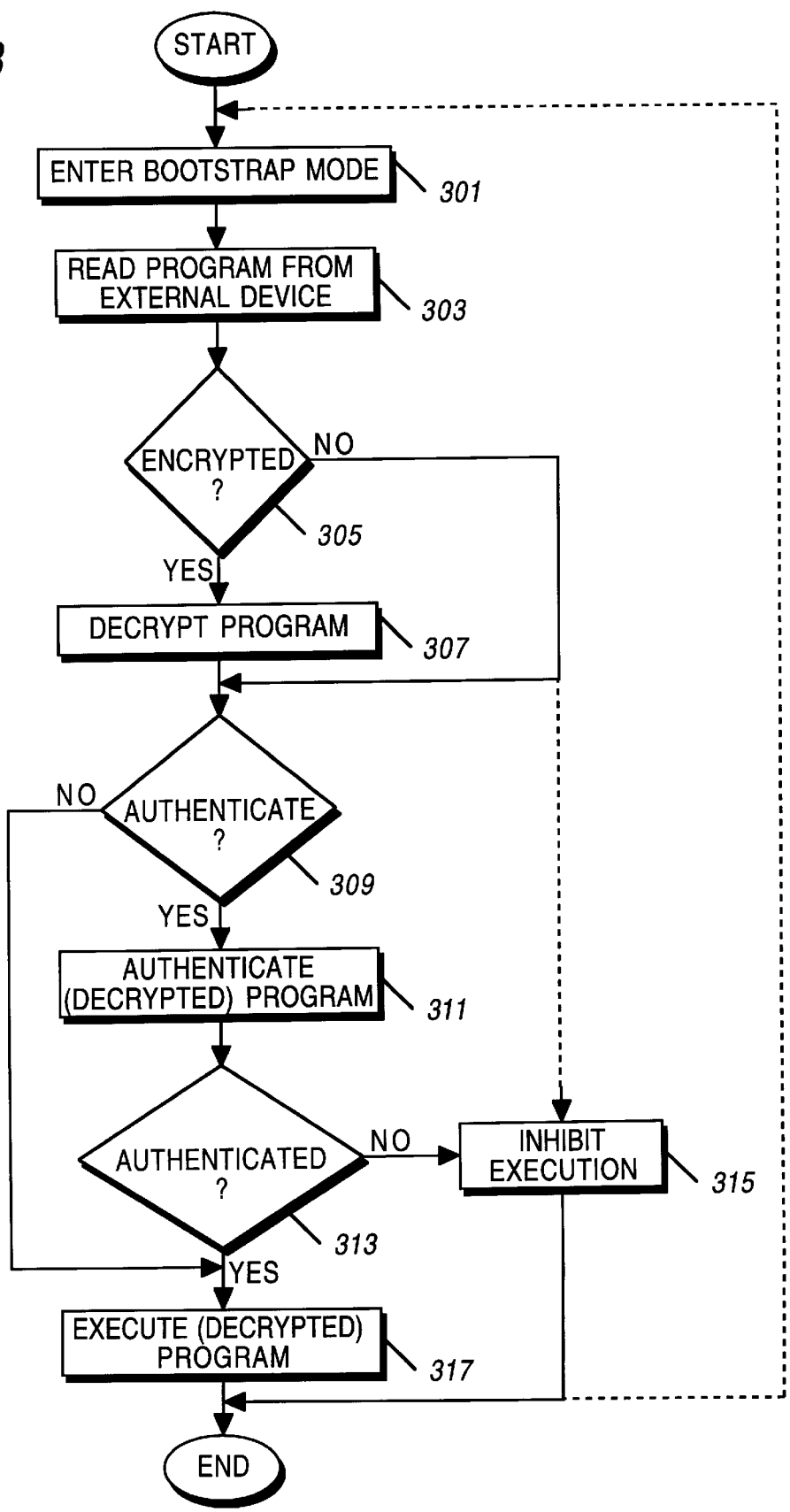
FIG. 3 is a flowchart showing a method of decrypting and/or authenticating a bootstrap program in accordance with the invention.

A flowchart of a method of decrypting and/or authenticating a bootstrap program is shown in FIG. 3. In the preferred embodiment, the steps of the method of FIG. 3 are performed by the bootstrap processing section 105 of the processor 101, except for steps 307 and 317. At step 301, the processor's 101 bootstrap mode is entered. At step 303, a program is read from the external device 103. At step 305, it is determined if the program read from the external device is encrypted. If the program is not encrypted, the process continues with step 309. Alternatively, if the program was not encrypted, the process may continue with step 315, where execution of the program is inhibited. Such an option would be chosen when it is desired to only have encrypted data downloaded into the processor, such as when secure information is only desired to be downloaded, or when it is desired to prevent altering of the external program before it is downloaded. Alternatively, at step 305, it may be determined if the program was properly encrypted. Properly encrypted data is data that has not been altered or erroneously decrypted/encrypted. When the program was not properly encrypted, the process would continue with step 315 (via the dashed line), where execution of the program by the processor is inhibited.

If the program was found to be encrypted at step 305, the program is then decrypted at step 307. In the preferred embodiment, the decryption step is performed by the decryption processing section 107 of the processor 101. The decryption process is tailored to the type of encryption that was used to encrypt the program in the external device 103. If, for example, asymmetric encryption key was used to encrypt the program in the external device 103, then the same key would be used to decrypt the program at step 307. Similarly, if a public encryption key system was utilized, the program was encrypted by a public key and placed in the external device 103, and the processor 101 uses a private key to decrypt the same message. The key 113 used for decryption is embedded inside the processor in the preferred embodiment. The key 113 may be stored in RAM, ROM, programmable non-volatile memory, fixed hardware, and so forth. The decryption step may also include processing a key into another key or another piece of information to be used to decrypt the program.

At step 309, it is determined if the program to be downloaded from the external device 103 is to be authenticated. Although externally encrypting the program to be bootstrapped into the processor 101 provides security, in part because an undesired party would not easily be able to decrypt the program in the external device 103, additional security is possible either for encrypted or unencrypted programs by performing authentication verification on the program. Such authentication would, among other benefits, prevent an external program from running internal to the processor 101 and potentially causing sensitive information within the processor 101 to be output by the processor 101, thereby compromising the information within the processor 101. The authentication process may also prevent undesired programs from running, which undesired programs might cause desired programs to malfunction, create undesirable processing patterns or pathways, take processing power from desirable processor functions, and so forth. Internal code and hardware (functions) may be kept away from unauthorized access or use, and further unauthorized reading in and unauthorized reading out of the data may also be prevented, while providing for authorized reading in and authorized reading out without limitation.

At step 311, the program, which may be a decrypted program, is authenticated. If, for example, a checksum or hash was used to authenticate the program, then a checksum or hash should be performed on the (decrypted) program at step 311. If at step 313, the program is not successfully authenticated, execution of the program is inhibited at step 315, and the process ends. Inhibiting of the execution of the program may include stopping the processor 101 from executing any downloaded code until the processor 101 is restarted, including flushing the (decrypted) program that was downloaded into the processor 101 from the external device 103. Alternatively, the processor 101 may be designed and/or programmed in such a way as to prevent the processor 101 from executing the program without successfully completing the authenticating process, i.e., no back around the authentication door (method to defeat the authentication) is provided. The deactivating may also include placing the processor in an infinite loop or starting the process again beginning with step 301 (via the dashed line). In addition, the failure to authenticate may be indicated with an error message external to the processor, such that a display may indicate to a user that the bootstrap download failed. If at step 313, the (decrypted) program is authenticated, the authenticated (decrypted) program is executed at step 317, and the process ends.

The present invention provides a method for keeping external codes secure and protected from reverse engineering. Alternate embodiments of the invention provide up to three different levels of security. The present invention provides a way to prevent unwanted code from being executed in a processor, which unwanted code might divulge secret or sensitive information stored within the processor. Internal code and hardware are protected from unauthorized access or use. Additional authorized reading in and further authorized reading out of the downloaded, potentially encrypted and authenticated program, is also provided.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   entering a bootstrap mode of a processor;
   during the bootstrap mode:
   reading, into a memory within the processor, a bootstrap program from a device external to the processor;
   decrypting the bootstrap program using a key embedded inside the processor, yielding a decrypted program;
   performing authentication verification on the decrypted program;
   executing, by the processor, the decrypted program only after the decrypted program is authenticated, and when the decrypted program fails to be authenticated, inhibiting execution of the decrypted program by the processor.

2. The method of claim 1, further comprising the steps of:
   determining if the bootstrap program was properly encrypted;
   when the bootstrap program was not properly encrypted, inhibiting execution of the program by the processor.

3. The method of claim 1, wherein the bootstrap program is stored as an encrypted bootstrap program in the device external to the processor.

4. The method of claim 1, wherein the step of inhibiting execution of the decrypted program by the processor comprises the step of stopping the processor from executing any code from the decrypted bootstrap program until a restart of the processor.

5. The method of claim 1, wherein the step of inhibiting execution of the decrypted program by the processor comprises the step of entering the processor into an infinite loop.

6. The method of claim 1, wherein the step of inhibiting execution of the decrypted program by the processor comprises the step of indicating the failure to authenticate with an error message.

7. The method of claim 1, wherein the step of inhibiting execution of the decrypted program by the processor comprises the step of starting the process again, beginning with the entering step.

8. The method of claim 3, wherein a key needed to decrypt the bootstrap program is not stored on the device external to the processor.

9. The method of claim 3, wherein the step of performing authentication verification comprises the step of performing a checksum on the decrypted program.

10. The method of claim 3, wherein the step of performing authentication verification comprises the step of performing a hash on the decrypted program.

11. The method of claim 3, wherein the step of performing authentication verification comprises the step of performing an encrypted checksum on the decrypted program.

12. The method of claim 3, wherein the step of performing authentication verification comprises the step of checking a digital signature of the decrypted program.

13. The method of claim 3, wherein the key embedded inside the processor is a public decryption key.

14. The method of claim 3, wherein the key embedded inside the processor is a private decryption key.

15. The method of claim 3, wherein the key embedded inside the processor is a symmetric decryption key.

16. The method of claim 3, wherein the key embedded inside the processor is processed into another key that is used to decrypt the program.

17. The method of claim 3, wherein the step of inhibiting execution of the decrypted program by the processor comprises the step of preventing the processor from exiting the bootstrap mode unless the decrypted program is authenticated.

18. A processor comprising:
    a first memory, arranged and constructed to obtain a bootstrap program from a device external to the processor during a bootstrap mode;
    a decryption processor, operably coupled to the first memory, arranged and constructed to decrypt the bootstrap program utilizing a key stored within the processor during the bootstrap mode;
    a second memory arranged and constructed to store, during the bootstrap mode, the decrypted program for subsequent execution by the processor;
    wherein the processor is arranged and constructed to performing authentication verification on the decrypted program and execute the decrypted program only after successful authentication of the decrypted program as an intended program.

19. The processor of claim 18, wherein the bootstrap program is stored as an encrypted bootstrap program in the device external to the processor.

20. The processor of claim 19, wherein a key needed to decrypt the bootstrap program is not stored on the device external to the processor.

21. The processor of claim 18, wherein the processor is arranged and constructed to inhibit execution of the decrypted program by stopping the processor from executing any code from the decrypted bootstrap program until the processor restarts.

22. The processor of claim 18, wherein the processor is arranged and constructed to exit the bootstrap mode only after successful authentication of the decrypted program.

23. A method comprising the steps of:

entering a bootstrap mode of a processor;

during the bootstrap mode:
- reading, by a first memory within the processor, a bootstrap program stored as an encrypted bootstrap program in a device external to the processor;
- decrypting the bootstrap program, yielding a decrypted program;
- performing authentication verification on the decrypted program;

when the program is authenticated, executing, by the processor, the decrypted program;

when the decrypted program fails to be authenticated, inhibiting execution of the decrypted program by the processor.

24. The method of claim 23, wherein a key needed to decrypt the bootstrap program is not stored on the device external to the processor.

25. The method of claim 23, wherein the step of inhibiting execution of the decrypted program by the processor comprises the step of stopping the processor from executing any code from the decrypted bootstrap program until a restart of the processor.

26. The method of claim 23, wherein the step of inhibiting execution of the decrypted program by the processor comprises the step of preventing the processor from exiting the bootstrap mode unless the decrypted program is authenticated.

* * * * *